Figure 1:
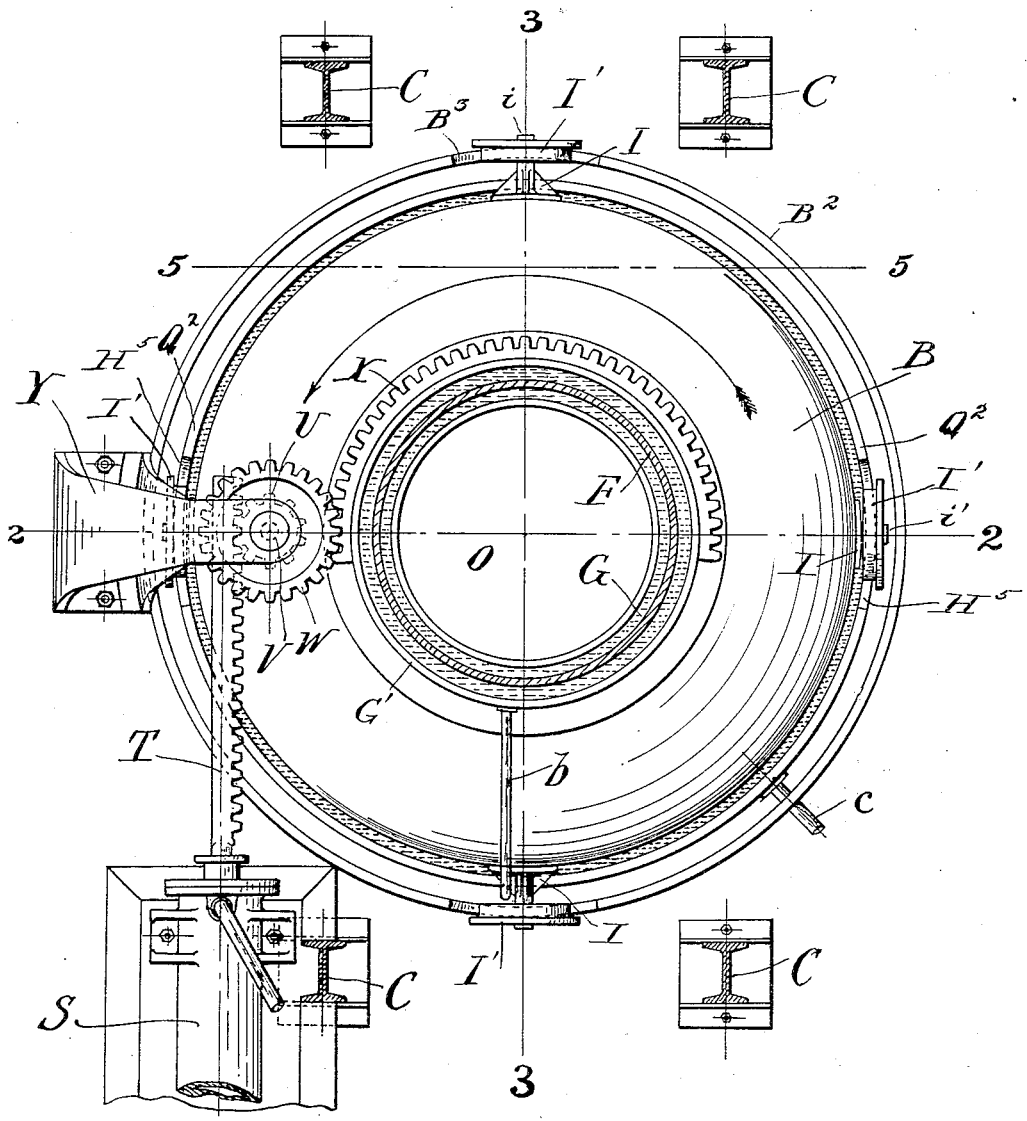

No. 738,236. PATENTED SEPT. 8, 1903.
H. PRENTICE & F. J. DEEMER.
WATER SEALED REVERSING VALVE FOR REGENERATIVE FURNACES.
APPLICATION FILED MAR. 27, 1903.
NO MODEL. 5 SHEETS—SHEET 1.

No. 738,236. PATENTED SEPT. 8, 1903.
H. PRENTICE & F. J. DEEMER.
WATER SEALED REVERSING VALVE FOR REGENERATIVE FURNACES.
APPLICATION FILED MAR. 27, 1903.
NO MODEL. 5 SHEETS—SHEET 3.

No. 738,236. PATENTED SEPT. 8, 1903.
H. PRENTICE & F. J. DEEMER.
WATER SEALED REVERSING VALVE FOR REGENERATIVE FURNACES.
APPLICATION FILED MAR. 27, 1903.
NO MODEL. 5 SHEETS—SHEET 5.

WITNESSES:
S. M. Stone
B. Pattison

INVENTORS
Hugh Prentice
Frank J. Deemer
BY
Clark Dummer
ATTORNEYS

No. 738,236.

Patented September 8, 1903.

UNITED STATES PATENT OFFICE.

HUGH PRENTICE AND FRANK J. DEEMER, OF CLEVELAND, OHIO.

WATER-SEALED REVERSING-VALVE FOR REGENERATIVE FURNACES.

SPECIFICATION forming part of Letters Patent No. 738,236, dated September 8, 1903.

Application filed March 27, 1903. Serial No. 149,835. (No model.)

*To all whom it may concern:*

Be it known that we, HUGH PRENTICE, a subject of the King of Great Britain, and FRANK J. DEEMER, a citizen of the United States, both residents of Cleveland, county of Cuyahoga, and State of Ohio, have invented certain new and useful Improvements in Water-Sealed Reversing-Valves for Regenerative Furnaces, of which the following is a specification, reference being had to the accompanying drawings, forming a part thereof, in which similar letters of reference indicate corresponding parts in all the figures.

The subject of the present invention is a water-sealed reversing-valve for regenerative furnaces, and has for its more prominent objects high efficiency of the water-seal at the various joints, particularly during the reversing movements of the valve, water cooling, as well as sealing of the valve, avoidance of inner working parts which are liable to get out of order, and provision for affording large inlet and outlet areas in comparison with the dimensions of the valve structure generally. Simplicity of the valve-operating means is also an important consideration connected with the valve.

With the above and other purposes in view the novel reversing-valve comprises an elevated valve-controlled gas-box having a water-sealed relation with the upper part of an outer water-cooled casing, and an inner water-cooled partition extending transversely within the valve and adapted to establish communication between the gas-box and one of the furnace-flues, while the other flue communicates with the discharge or stack, or vice versa, according to the position of the valve, novel and extremely simple means being provided whereby in reversing both the outer casing and partition will be elevated to permit the change of position of the parts without impairing the water-seal of either, the ends of the partition being, however, raised from the seal, but to an unobjectionable extent, to permit the clearance of such parts and their corresponding resumption of position at the termination of each reversing movement.

Another important feature connected with the invention is the provision whereby the several water-spaces are intercommunicating to provide for the circulation of the water and the consequent cooling of the casing and the partition.

There are other novel features embodied in the reversing-valve, which are also explained in the subsequent extended description.

Figure 2:
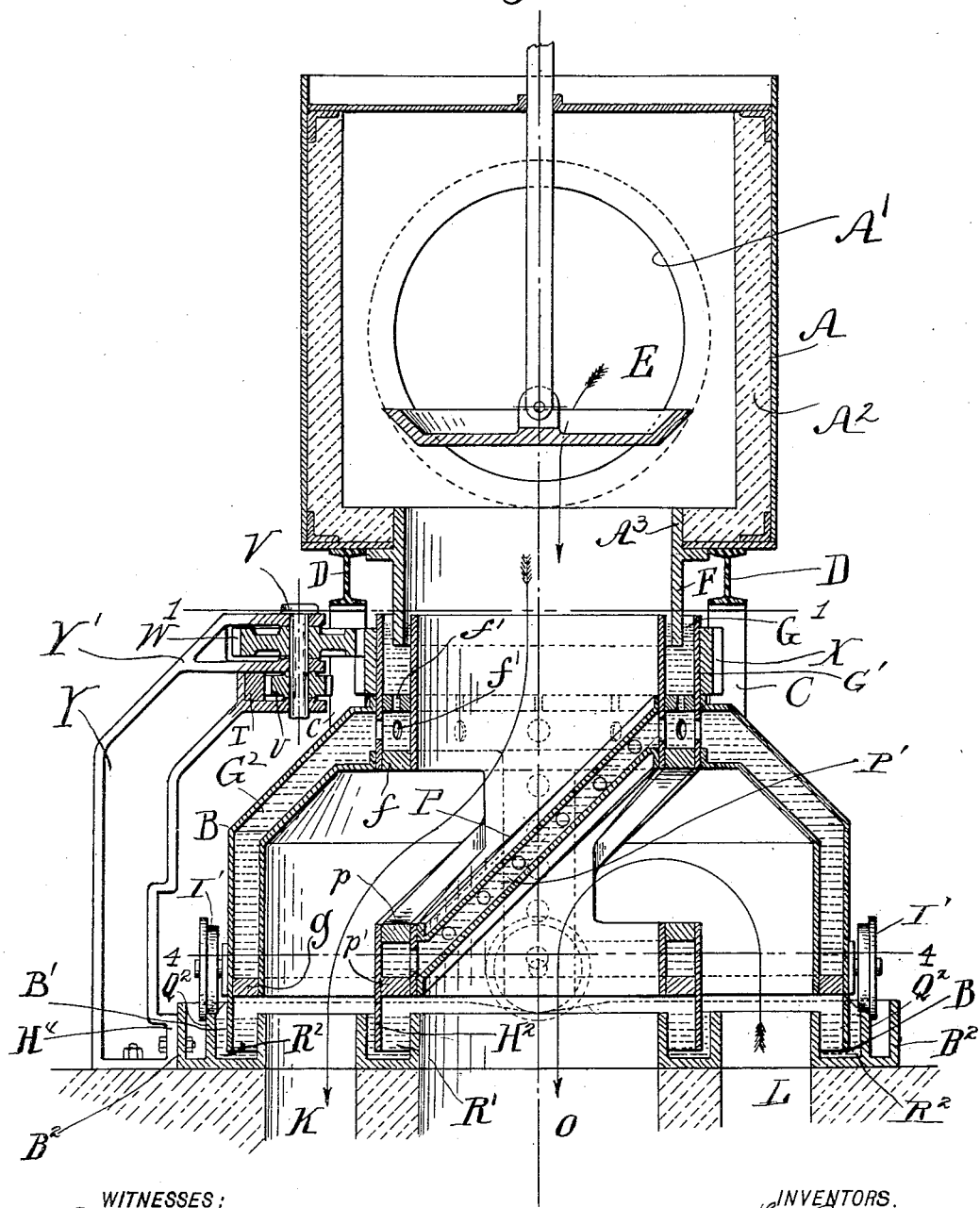
Figure 3:
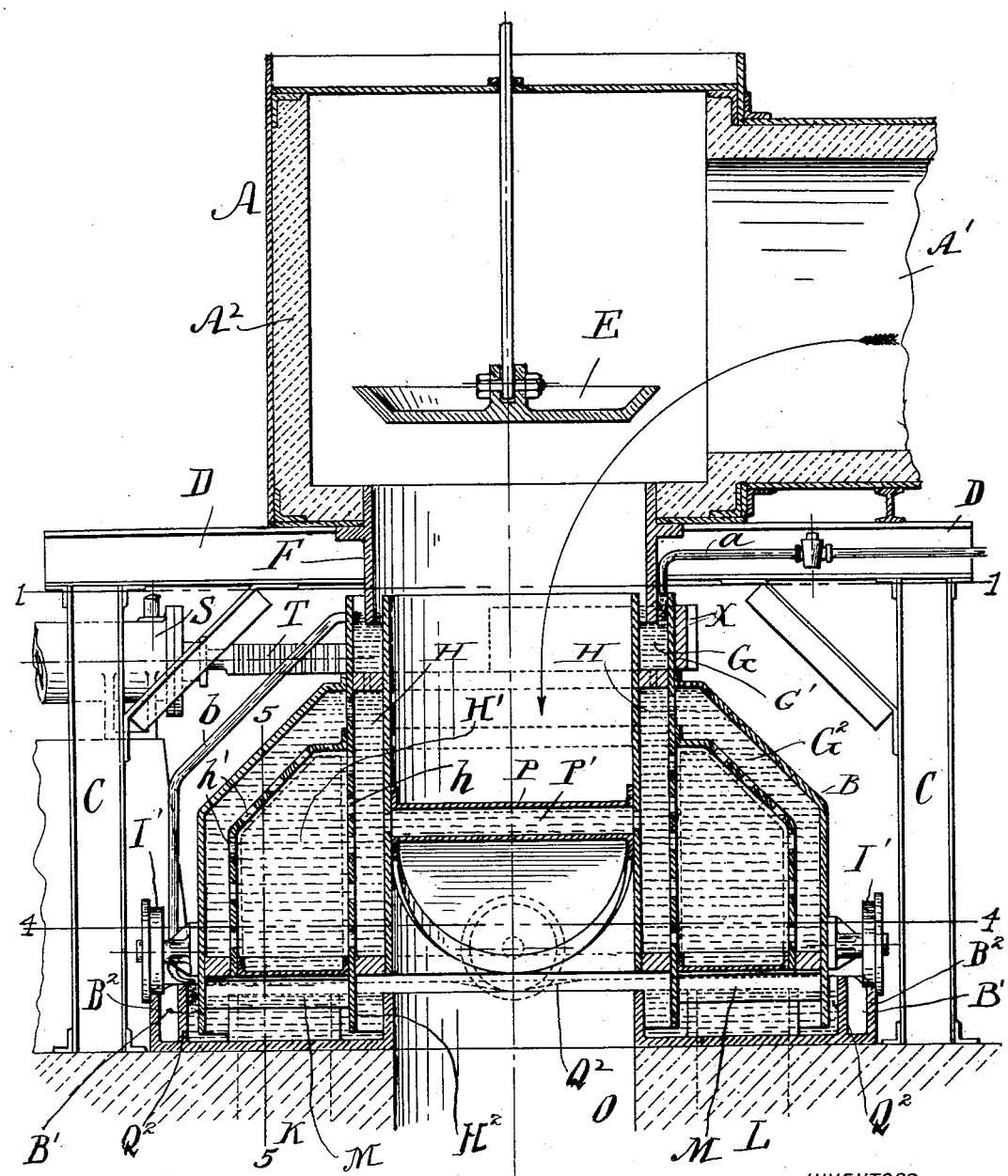
Figure 4:
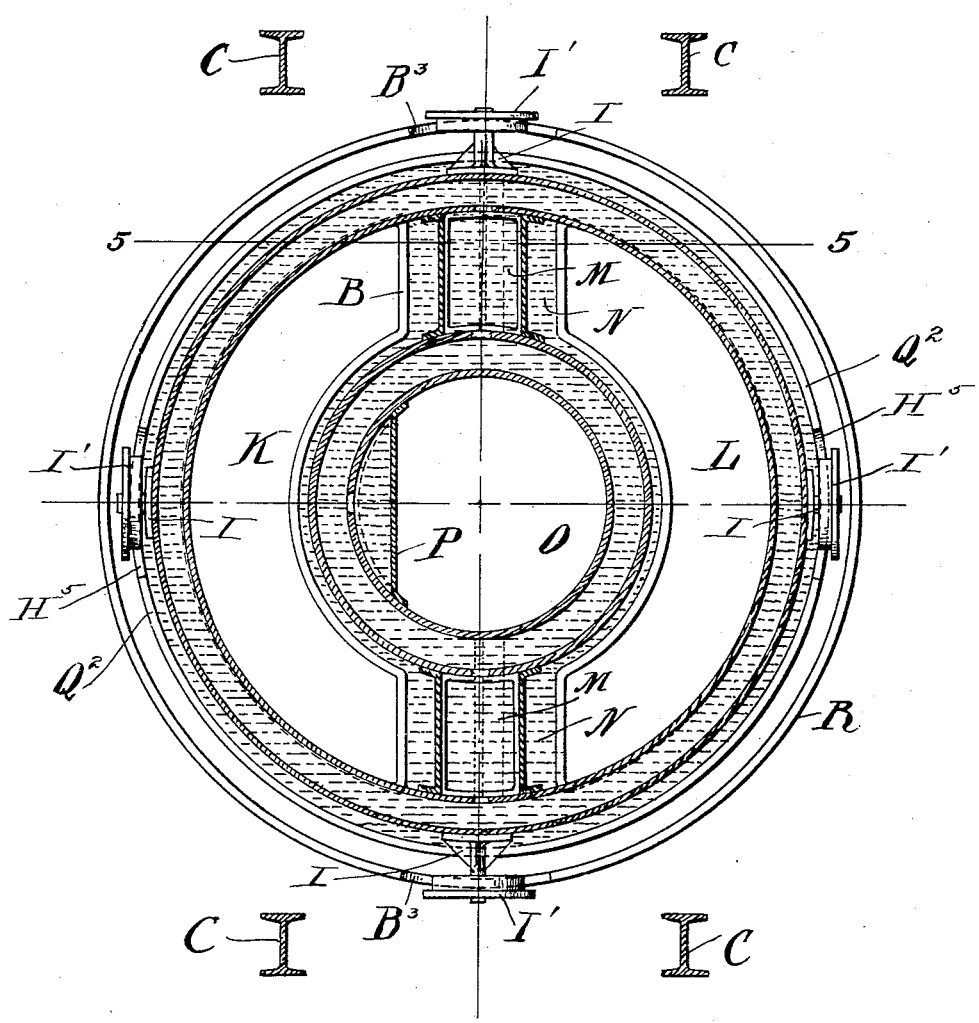
Figure 5:
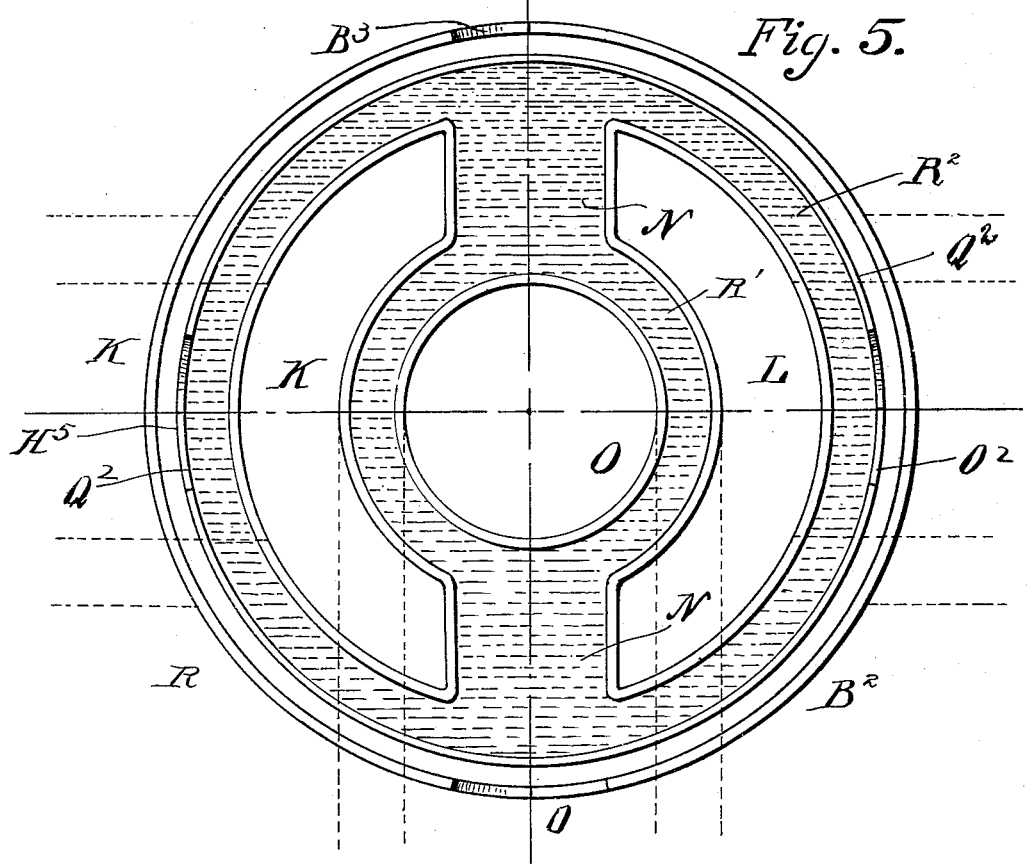
Figure 6:
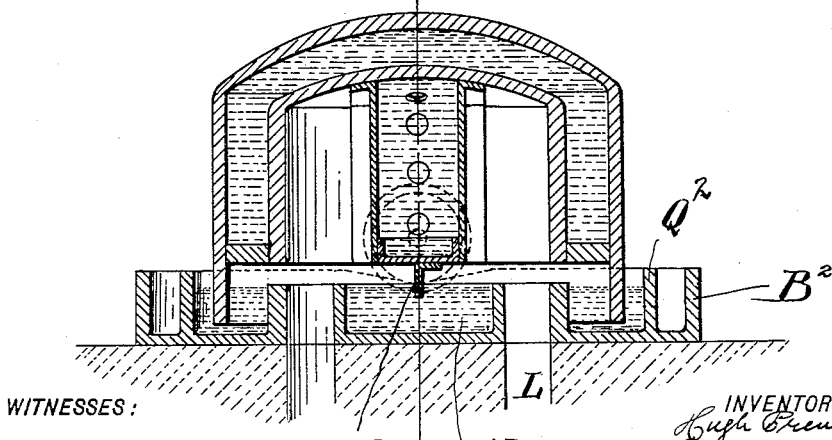

In the accompanying drawings, forming part of this specification, Figure 1 is a sectional plan view of a reversing-valve embodying our invention, the section being taken in the plane indicated by the broken line 1 1, Fig. 2. Fig. 2 is a vertical section through the reversing-valve, the section being taken in the plane indicated by the broken line 2 2, Fig. 1. Fig. 3 is a somewhat similar view of the valve, the section being taken in a plane at right angles to that of Fig. 2—*i. e.*, in the plane indicated by the broken line 3 3 of said latter figure. Fig. 4 is a horizontal sectional view through the lower portion of the valves, as indicated by the broken line 4 4 of Fig. 3. Fig. 5 is a plan view of the water-trough at the base of the valve. Fig. 6 is another vertical sectional view of the valve, the section being taken in the plane indicated by the broken line 5 5, Fig. 1.

The gas-box A, which is supplied with gas through the ample opening A' in one side, is supported in an elevated position by the posts or standards C and cross-beams D, or otherwise, as circumstances may require. The box A preferably contains a lining $A^2$ of refractory material and has secured and bearing in its bottom a metal ring $A^3$, from which depends the flange F.

Snugly through a centrally-located opening in the top of the box plays the vertical spindle of a mushroom-valve E, pivotally connected to the lower end of said spindle to adapt it for the seating presented by the upper edge of the ring $A^3$. Obviously this valve serves to regulate the volume of gas permitted to pass from the box downward through its bottom opening.

The lower portion of the depending flange F is normally immersed in water contained in the trough G, presented by the upper contracted neck G', carried by the outer casing B of the valve. It will be observed that the casing as well as the neck is double-walled to provide a water-space $G^2$, division-rings $f$ $g$ being employed to secure individuality of the water-spaces, small openings $f'$ establishing circulating communication between said spaces.

Connected with and carried by both the neck and outer casing is an inner casing comprising diametrically-located water-legs H, formed by vertically-depending extensions of the double-walled neck and communicating through circulating-openings $h$ with diametrically-located water-spaces H', which in turn communicate through numerous small openings with the water-space of the outer casing.

A diagonally-disposed partition P is connected to and located between the legs H, said partition being likewise double-walled to present a water-space P'. The partition P has the top and bottom closures $p\ p'$ for securing the closed character of its water-space.

By reference to Figs. 2 and 3 it will be noted that the outer walls of both the outer and inner casings extend in a plane below their companions to constitute lower vertical flanges B' and $H^2$, which extend entirely around their respective casings.

R designates an annular horizontal base-casting having openings which correspond in plan area and location with the intersecting ends of the flues K and L, communicating with the regenerating-chambers and the intermediate opening O, which leads to the discharge or stack.

The casting R provides inner and outer annular concentric troughs $R'\ R^2$, into which the flanges depend to be immersed and sealed in water normally therein. The two troughs communicate through short cross-channels N, in the water of which are immersed the gates M, depending from the bottoms of the intermediate chambers H', so as to secure an effective water-seal entirely across the apparatus.

An outer flange $B^2$ of the base and the outer of the flanges $Q^2$ are each provided at diametrically opposite points with inclined risers $B^3\ H^5$, the risers of one flange occupying positions quartering with respect to those of the other flange, as most clearly indicated in Fig. 5.

Projecting from brackets I, secured on the outer casing near its bottom, are short horizontal journals $i\ i'$, upon which are revolubly mounted flanged carrying-rollers I', resting and adapted to travel on the upper edge of the flange $B^2$ and the outer of the flanges $Q^2$, the length of the journals relatively varying to provide for the different concentric positions of said flanges.

As shown in Fig. 2, the valve is so adjusted that gas is admitted to the flue K, leading to one of the regenerating-chambers, while the flue L of the other regenerating-chamber is in communication with the flue O, leading to the discharge or to the stack. Now by revolving the outer casing bodily and parts carried therewith, the relative communication between the flues will become so reversed that the gas will be delivered to the flue L and flue K placed in communication with the discharge O in a manner and for a purpose well understood by those familiar with this class of apparatus. Attention is, however, directed to the fact that the several inclined risers are so located with regard to the normal position of the valve in one direction or the other that upon the initiation of the reversing operation the rollers I' immediately ascend on the risers, with the result that the entire outer casing and parts carried thereby are coincidently with the valve-reversing movement elevated to such extent as will primarily lift the gates M clear of the walls of the cross-channels and permit said casing and parts to be rotated to reverse the position of the valve, as aforesaid.

The means for effecting the rotation of the parts is of exceedingly efficient and simple character and comprises a double-acting hydraulic cylinder S, suitably supported in juxtaposition to the upper portion of the valve, the piston within said cylinder actuating a horizontal rack T, which is slidingly guided through a bracket Y', presented at the upper end of a standard Y. Revolving with a vertical pin V, mounted in said bracket, is a pinion U, with which the rack meshes, and an upper gear-wheel W, engaging a gear-segment X, rigidly secured on the neck of the outer casing. Manifestly by admitting the motor fluid to one side or the other of the piston the rack will be projected or retracted to effect the rotation of the valve in one direction or the other, as desired.

From the foregoing description it will be appreciated that a reversing-valve embodying our invention serves to efficiently maintain the water seal at all the points where required. Moreover, the arrangement of intercommunicating water-spaces is of such ample character that an effective circulation of water can be maintained throughout the same, the supply of water being delivered to the upper trough in the neck by the valve-pipe $a$, while a pipe $b$, leading to the outer trough in the base, constitutes an overflow. A pipe $c$, leading from the base, serves for the withdrawal of the water from the latter. By this means all these parts and walls of the valve, which are liable to become unduly heated, are maintained at a comparatively low temperature. This is peculiarly important in view of the liberal area of the flue communications, and especially with respect to the extended transverse character of the partition P and water-legs at diametrically opposite points thereof. It will also be noted that the construction is comparatively compact notwithstanding the liberal area of the flue communications through the valve.

We do not wish to be understood as limiting ourselves to the particular construction shown and described, as the same may be subject to modification and change and still within the spirit of our improvements.

Having now described our invention, what we claim as new, and desire to secure by Letters Patent, is—

1. In a reversing-valve, the combination with an upper gas-inlet including a depending flange, of a vertical casing having a water-space throughout its height and provided with an upper trough in which the flange is immersed, an interior transverse partition, a base containing flue-openings for communicating with the plurality of regenerating-chambers and the discharge respectively, said base containing a sealing-trough for said valve-casing, and means for rotating said casing and its partition.

2. In a reversing-valve, the combination with an upper gas-inlet, of an outer casing having a water-space throughout its height and provided with an upper sealing-trough in circulating communication with said water-space, an interior partition also having a water-space in circulating communication with the trough and casing-space, a base containing the several flue-openings and provided with a sealing-trough, and means for rotating said casing and partition.

3. In a reversing-valve, the combination with a gas-inlet, of an outer casing containing the reversing-partition and having the supporting-rollers, a base containing the several flue-openings and having flanges forming a sealing-trough and provided with inclined risers, and means for rotating said casing and partition on the base to effect the reversal of the valve and intermittent elevation of said casing and partition.

4. In a reversing-valve, the combination with a suitable gas-inlet, of an outer casing having a vertically-extending water-space and upper seal, a transverse partition within said casing also provided with a water-space and hollow water-legs at each side thereof, the spaces of the legs and those of the partition and outer casing in intercommunication, a base containing the several flue-openings and providing a water seal for the outer casing and legs, and means for rotating said outer casing, the partition and legs.

5. In a reversing-valve, the combination with a suitable gas-inlet, of an outer casing providing the upper water seal and containing a vertically-extending water-space, and inner inclined partition and adjacent water-legs forming in connection with the casing, diametrically-located water-chambers $H'$, a base providing annular troughs for said casing and water-legs and having cross-channels for normally receiving gates depending from the bottom of said chambers, said base also having inclined risers for coacting with rollers upon which the casing is mounted, and means for rotating said casing relative to the base.

6. In a reversing-valve, the combination with a suitable gas-inlet including a depending flange, of an outer casing having an upper trough for sealing said flange and provided with an upper series of gear-teeth and inner reversing-partition, a base containing the several flue-openings and providing the lower sealing-troughs, and a hydraulic cylinder supported in relation to said valve and actuating a rack geared with said series of gear-teeth to effect the reverse movements of the valve.

In testimony that we claim the foregoing as our invention we have signed our names, in the presence of two witnesses, this 7th day of February, 1903.

HUGH PRENTICE.
FRANK J. DEEMER.

Witnesses:
RAYMOND BRADY,
THOS. H. DILLON.